(12) United States Patent
Ehnert et al.

(10) Patent No.: US 6,838,148 B1
(45) Date of Patent: Jan. 4, 2005

(54) CARBON-FIBRE-REINFORCED SMC FOR MULTI-AXIALLY REINFORCED COMPONENTS

(75) Inventors: Gerd Ehnert, Vic Fezensac (DE); Klaus Bieniek, Knittlingen-Hohenklingen (DE); Karl-Heinz Ilzhoefer, Kirchheim/Teck (DE); Jurgen Stieg, Wasbuttel (DE)

(73) Assignee: Menzolit Fibron GmbH, Bretten (DE)

( * ) Notice: Subject to any disclaimer, the term of this patent is extended or adjusted under 35 U.S.C. 154(b) by 0 days.

(21) Appl. No.: 10/069,877
(22) PCT Filed: Aug. 30, 2000
(86) PCT No.: PCT/EP00/08427

§ 371 (c)(1),
(2), (4) Date: Jun. 11, 2002

(87) PCT Pub. No.: WO01/19599

PCT Pub. Date: Mar. 22, 2001

(30) Foreign Application Priority Data

Sep. 11, 1999 (DE) .......................................... 199 43 442
Oct. 13, 1999 (DE) .......................................... 199 49 318

(51) Int. Cl.$^7$ ................................................. B32B 5/12
(52) U.S. Cl. ........................ 428/109; 428/112; 428/114; 428/295.4; 428/359; 428/300.7; 428/299.4; 428/297.4

(58) Field of Search .............................. 428/109, 300.7, 428/112, 299.4, 114, 297.4, 295.4, 212, 215; 264/145, 160, 112, 331, 320

(56) References Cited

U.S. PATENT DOCUMENTS 3,183,142 A * 5/1965 Tierney ...................... 428/109
4,141,929 A * 2/1979 Stoops et al. ................. 525/12
4,532,169 A * 7/1985 Carley ........................ 428/109

* cited by examiner

Primary Examiner—Merrick Dixon
(74) Attorney, Agent, or Firm—Antonelli, Terry, Stout & Kraus, LLP

(57) ABSTRACT

The invention relates to an SMC (sheet moulding compound) for producing fibre-reinforced duroplastic components. Said SMC consists of a resin matrix (2) which is fibre-reinforced with unidirectional fibres (UD-fibres) (7) that are arranged in axial alignment and preferably with additional cut fibres (random fibres) (4) that are arranged in a non-aligned manner in the resin matrix. According to the invention, in order to achieve extremely high rigidity in a multi-axial direction with a low surface weight, several layers of SMC are arranged in the component, each layer containing UD-fibres (7) with a different alignment from one another.

43 Claims, 7 Drawing Sheets

CARBON-FIBRE-REINFORCED SMC FOR MULTI-AXIALLY REINFORCED COMPONENTS

BACKGROUND OF THE INVENTION

The invention relates to an SMC for producing fibre-reinforced thermosetting components, a corresponding production process and a component produced from this SMC.

SMC stands for "Sheet Moulding Compound" and is a resin mat according to DIN 16913. In general, SMC refers to a flowable resin mat based on unsaturated polyester resin or vinyl ester resin and random fibre distribution in the plane of the mat. The reinforcing fibres customarily used are glass fibres. A typical SMC formulation consists of about 30% of polymer, about 30% of filler and about 30% of glass fibres, the remainder being composed of additives, such as, for example, colouring pigments, hardeners, dispersing auxiliaries, fillers and similar materials. SMC is generally produced as follows: the resin matrix is applied to two carrier films. These carrier films are drawn through an SMC machine and in the process transport the resin matrix, onto which the reinforcing fibres are sprinkled or laid. Once the reinforcing fibres have been deposited, the two films are pressed together to produce a kind of sandwich. This sandwich is transported through an impregnating section, which uses pushing and rocking movements to ensure that the fibres are uniformly wetted with the resin matrix. At the end of the machine, it is wound onto reels. Of crucial importance is a ripening process, which may be initiated by chemical and/or physical means. After this ripening process, the SMC can be further processed. After stripping off of the carrier foils, the SMC is customarily processed or pressed in heated steel moulds to form shaped parts.

The advantage of SMC is the high flowability, which has the effect that only 30 to 50% of the pressing mould has to be covered. The strength and stiffness can be varied in a wide range, depending on the reinforcing-fibre content.

As an alternative, it is known to place a woven fabric in the resin matrix for reinforcement. The disadvantage of this is that, although the strength is substantially increased, there is hardly any flowability. The pressing mould must be completely covered, which requires exact cutting to size, resulting in a lot of waste.

Furthermore, SMC with a glass-fibre reinforcement comprising both cut fibres (random fibres) and unidirectional fibres (UD fibres) is known. The UD fibres produce increased strength and stiffness properties in an axial direction and the random fibres determine the transverse strength. This SMC is preferably employed only for support-type components, such as, for example, bumper supports. It is not possible to produce sheet-like components because of the high tendency of the components to become distorted.

SUMMARY OF THE INVENTION

The object on which the invention is based is to develop an SMC for producing fibre-reinforced thermosetting components such that a high strength and stiffness in a multi-axial direction is achieved in sheet-like thin-walled components. The basis for this is an SMC with an asymmetrical fibre structure, comprising a random fibre side and a UD fibre side.

According to the invention, this object is achieved in that several-layers of SMC containing UD fibres with a different axial alignment from one another are arranged in the component. Since the UD fibres govern the strength and stiffness properties, these properties are not only provided in an axial direction but in different directions. Owing to the high strength and stiffness, it is possible to produce lightweight components or ones with a thin wall structure.

In order to be able to produce a multi-layer SMC structure with desired component wall thicknesses of about 1.2 mm and large SMC as cut dimensions, the SMC weight per unit area must be less than 1000 g/m$^2$.

Until now, it has not been possible either to produce such low SMC weights per unit area industrially, or effectively from the point of view of strength and stiffness. The development of such an SMC has become interesting only with a UD carbon-fibre reinforcement and the resulting strength and stiffness properties for a multi-axial reinforcement in the component.

In comparison with the customary process techniques for the production of components from fibre composites with carbon fibres (resin transfer moulding, prepreg processing by the pressing or autoclave process), the SMC on which the invention is based has the following advantages:

- Simple as cut geometries, since despite UD fibre reinforcement the SMC is flowable
- No SMC clippings which have to be disposed of or recycled
- No trimming of the shaped parts, therefore no waste
- Short cycle times of the component production, therefore suitable for mass production.

A combination of random fibres formed of glass or carbon fibres with UD carbon fibres is preferred for the asymmetrically reinforced SMC which has been developed.

The SMC on which the invention is based covers 60–95% of the pressing mould. In order to produce the flowability of the UD carbon fibres in the UD direction, the continuous UD fibres are cut to a finite length. The finite UD fibre lengths may be between 25 mm and 650 mm. The ends of the finite UD fibres are offset from one another in order to avoid weak points in the SMC.

In a preferred embodiment, the UD fibre lengths are carbon fibre tows, for example produced by the "heavy tow" process. It is advantageous to use carbon fibres greater than 49 K for this purpose. Alternatively, broad-strip carbon fibre tows produced by the "heavy tow" process in widths of 10 mm to 500 mm can be used.

To check the UD fibre directions in the finished shaped part by X-ray inspection, individual glass fibre-yarns are introduced into the matrix in the direction of the UD fibres as contrast fibres.

To improve the fibre wetting, the flowability and to compensate for shrinkage, a different resin matrix is advantageously used for the random fibres and the UD fibres.

It is advantageous to introduce conductive additives into the resin matrix, in order to improve the electrical conductivity to such a degree that an electrostatic (ESTA) coating is possible without an additional conductive primer on the component.

The surface resistance should be between 10 and $10^6 \Omega$ at 5 V and the volume resistance be less than $10^5$ $\Omega$/cm.

A process according to the invention for producing a fibre-reinforced SMC having the above-mentioned properties is distinguished in that SMC mats with random fibres and a single layer of UD fibres are produced and in that a plurality of such SMC mats is arranged, prior to further processing to form the shaped part, with multi-axial alignment of the UD fibres by building up into a stack. This has the great advantage that an existing installation for producing an SMC comprising random fibres and UD fibres does not have to be altered. The multi-axial alignment is brought about by the building up of individual SMC mats into a stack, the SMC mats being stacked so as to be rotated relative to one another.

In a preferred embodiment, all the UD fibre layers used are aligned in the 0° direction and any desired number of fibre layers are used.

In an alternative preferred embodiment, at least four UD fibre layers are arranged in the following alignment:

0°, 90°, 90°, 0° or 0°, 90°, 0°, 90°.

The angles indicate that the next UD fibre layer below is arranged so as to be rotated by this angle relative to the first layer.

This means that the first layer is aligned at 0° and the second layer at 90° relative to the first layer.

In an alternative preferred embodiment, at least six UD fibre layers are arranged. In this case, the UD fibre layers expediently have the following alignment:

0°, 90°; +45°, −45°, 90°, 0°.

In an alternative embodiment, eight UD fibre layers are arranged with the following alignment:

0°, 90°; +45°, −45°, +45°, −45°, 90°, 0°.

For greater wall thicknesses, the material structure can be laid from multiples of 4 or 6 or 8 layers in the specified order one above the other.

A preferred embodiment of the process provides that the SMC mats (with one UD fibre layer) are cut into strips and wound onto spools, that the strips for the component production are cut to length and arranged in any desired position and the individual blank layers are built up into a stack in any desired angular position relative to one another on a rotary table. This has the advantage that even geometrically difficult blank shapes do not produce any waste.

As the final operation, the stack is either placed in the tool (press) for producing the component and the component is pressed or else, as an intermediate stage, is preshaped by prepressing for the purpose of securing, the press for preshaping being an inverse form of the mould for producing the component.

Preferably, the strips are wound onto spools with a core diameter of greater than or equal to 200 mm and an outside diameter of greater than or equal to 500 mm.

The SMC and processing technology according to the invention is versatile. It is preferably used to produce fibre-reinforced components, in particular for the automotive industry.

Components can be produced for a wide variety of applications, depending on the resin matrix. Interior and exterior parts joined together result in high strengths and stiffnesses in body elements, for example.

When using a non-shrinking resin matrix, it is possible to produce exterior parts of motor vehicles with a "class A" surface which, because of their electrical conductivity, can be electrostatically coated like sheet-metal parts.

BRIEF DESCRIPTION OF THE PREFERRED EMBODIMENTS

Further features of the invention will become apparent from the figures which are described below and in which:

FIG. 1 shows, schematically, an installation for producing SMC with one UD fibre layer, FIG. 2 shows, schematically, an apparatus for producing the blank layers and the multi-axial SMC, FIG. 3 shows, schematically, the production of the blank layers and the building up into a stack on a rotary table, FIG. 4 shows the pressing to form a shaped part, FIG. 5 shows, by way of example, a built up stack of individual UD fibre layers, FIG. 6 shows a finished shaped part with a schematic arrangement of the original UD fibre layers, and FIG. 7 shows the multi-axial alignment of the UD fibre layers.

DETAILED DESCRIPTION FOR THE PREFERRED EMBODIMENTS

FIG. 1 shows a machine or installation for producing SMC with a single UD-fibre layer. A resin paste or resin matrix 2 is applied to a film 1 using a doctor blade 3. Random fibres 4 are then sprinkled on. These random fibres 4 are glass fibres or carbon fibres, which are supplied as continuous fibres 5 to a cutting device 6 and are cut by the latter into small pieces of about 6–50 mm in length. Unidirectional UD fibres 7 are then laid on in the direction of travel of the web. These UD fibres 7 are preferably carbon fibres. Finally, a second film 1 is again coated with a resin matrix 2 using a doctor blade 3 and is laid onto the first film, resulting in a kind of sandwich. The subsequent impregnation in a chamber between honeycombs or honeycombs and binders, which may be arranged in a heating chamber, is not shown. This SMC thus produced is, according to the invention, cut on-line or off-line into strips of about 4–20 cm in width and wound onto reels.

FIG. 2 shows, schematically, the subsequent procedure. The reels 8 just mentioned are arranged offset in succession. Only two reels 8 are depicted here, by way of example. A film stripper 9 is arranged beside each of the reels 8. To produce the multi-axial SMC, the SMC is cut to length by a cutting tool 10 and displaced, resulting in a blank layer 11 of virtually any shape without clipping. The reference numeral 12 denotes the individual strips after cutting and before displacement. The displacement takes place on a conveying device 13. The individual layers 11 cut to size are then either built up into a stack with different axial alignment of the UD fibres on a rotary table 14 or else fixed directly by prepressing. The press 15 for preshaping is advantageously an inverse form of the mould for producing the shaped part.

FIG. 3 shows, schematically, the production of the blank layers 11 and the building up into a stack on a rotary table 14. The individual reels a are cut, according to requirements, and displaced to form a blank layer 11 and then stacked on a rotary table 14. This procedure does not produce any waste or clippings.

FIG. 4 shows the pressing to form a shaped part 16. A stack of built-up blank layers has been preshaped in a preshaping press 17. This preshaping press 17 is then placed together with the preshaped part into the press 18, the preshaping press is then withdrawn and the shaped part 16 is pressed.

FIG. 5 shows, by way of example, a built-up stack 19 of individual blank layers 11. In this example, the stack 19 consists of six layers with an orientation of the UD fibre layers of 0°, 90°, +45°, −45°, 90°, 0°.

Figure 1:
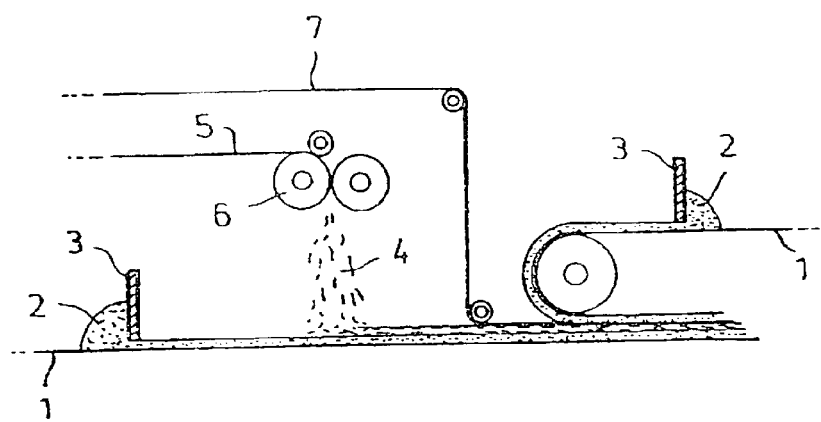
Figure 2:
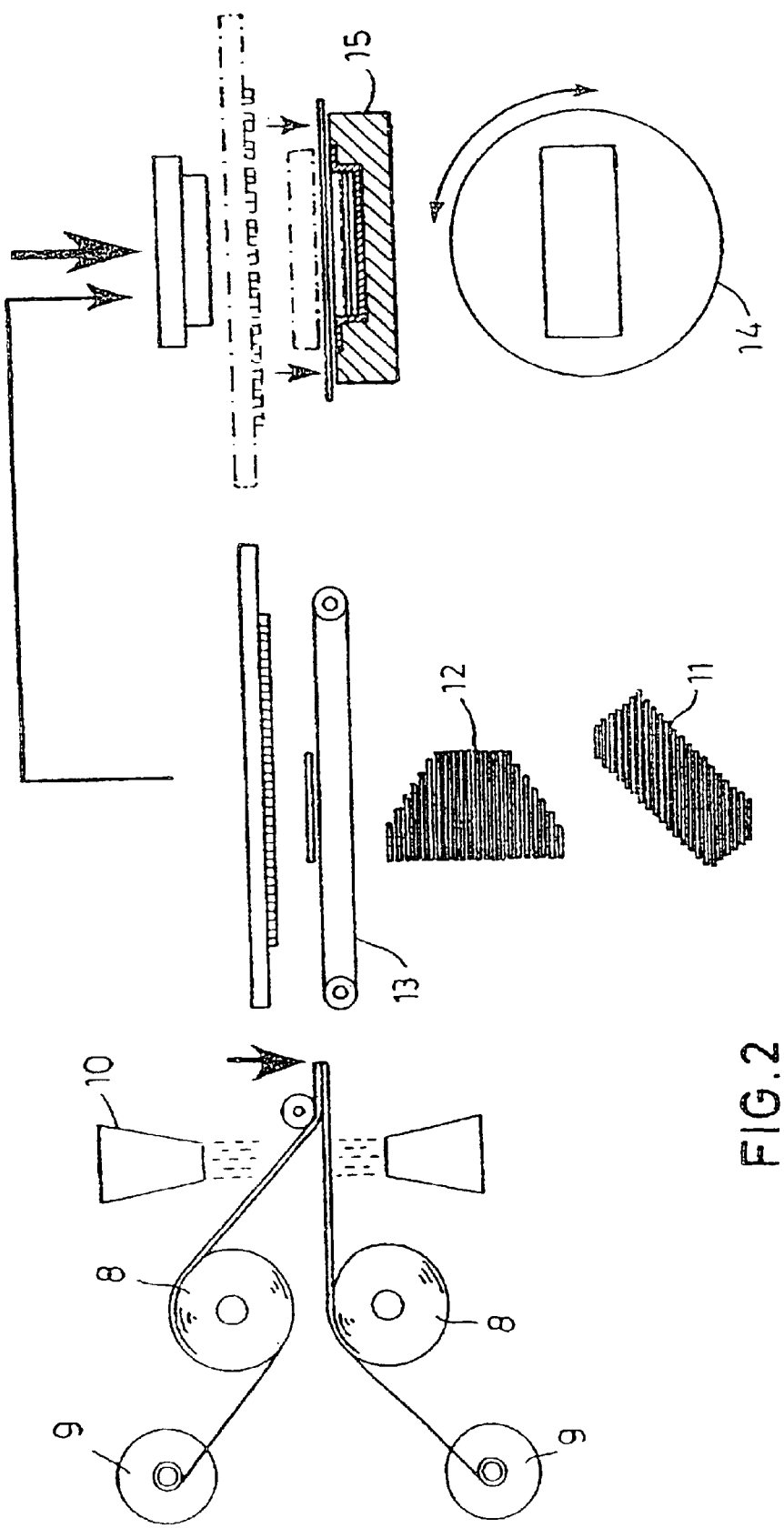
Figure 3:
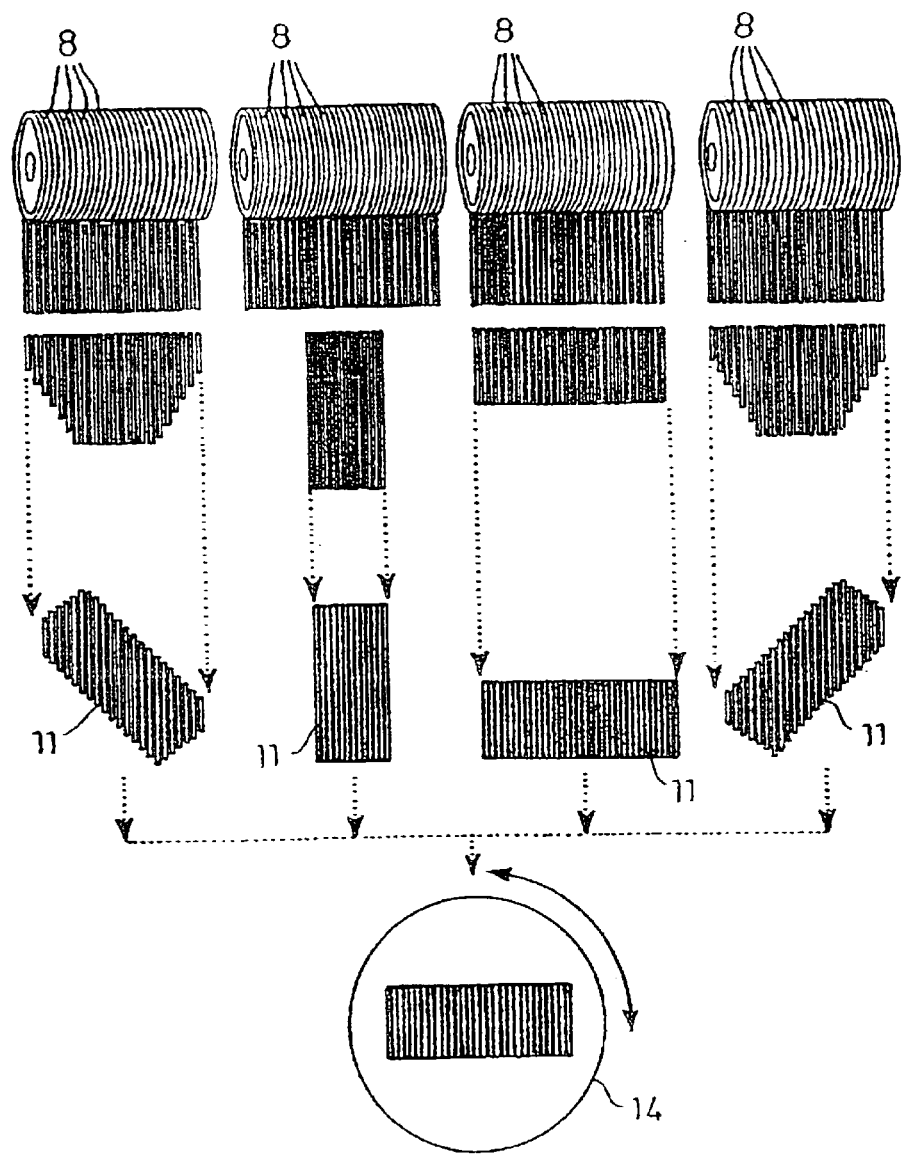
Figure 4:
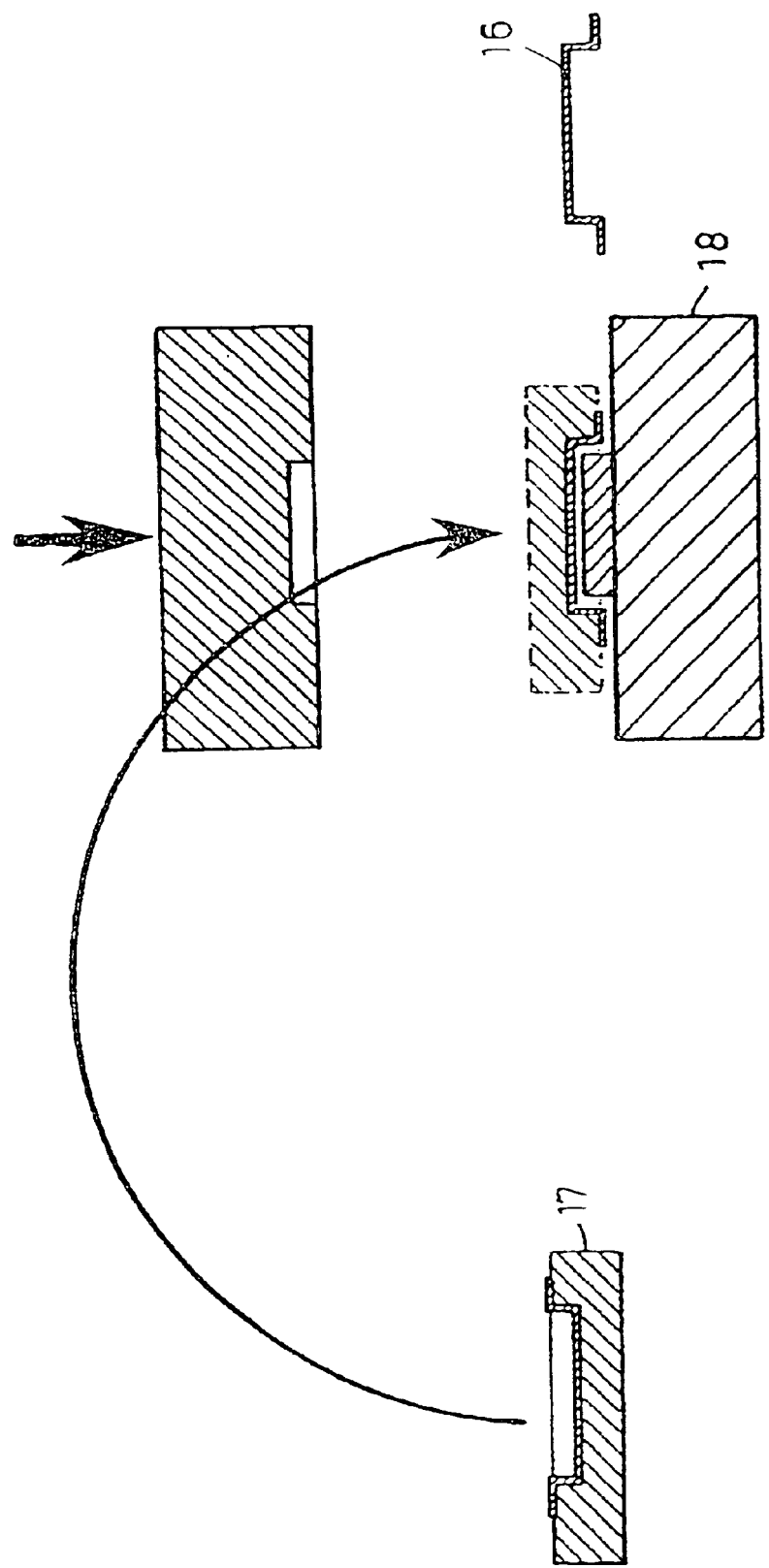
Figure 5:
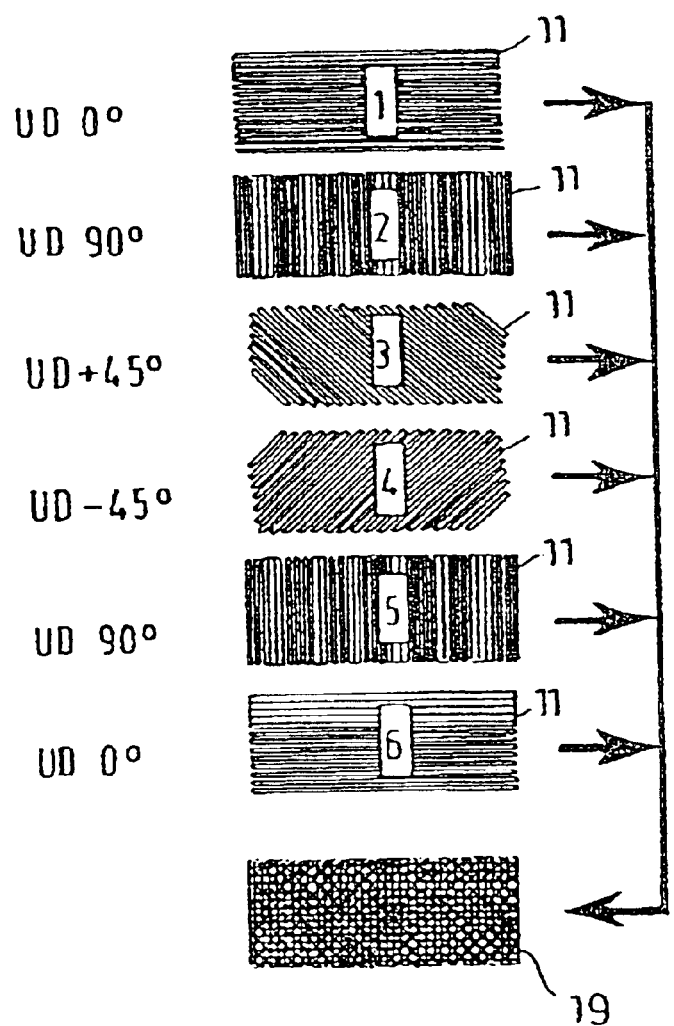
Figure 6:
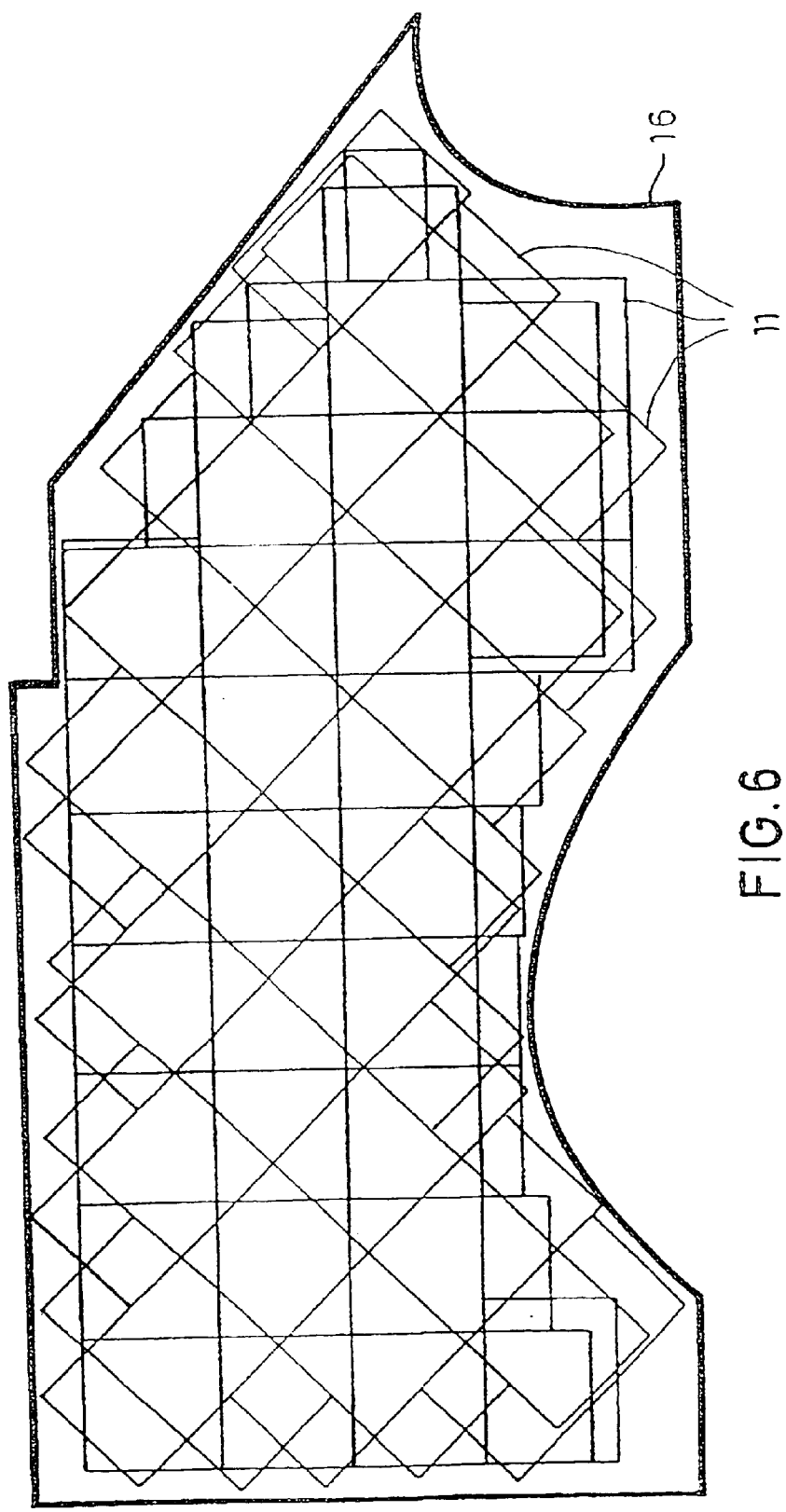
FIG. 6 shows a finished component (shaped part) 16 with a schematic arrangement of the individual UD fibre layers. The building up of the individual cut to size layers 11 can be clearly seen.
Figure 7:
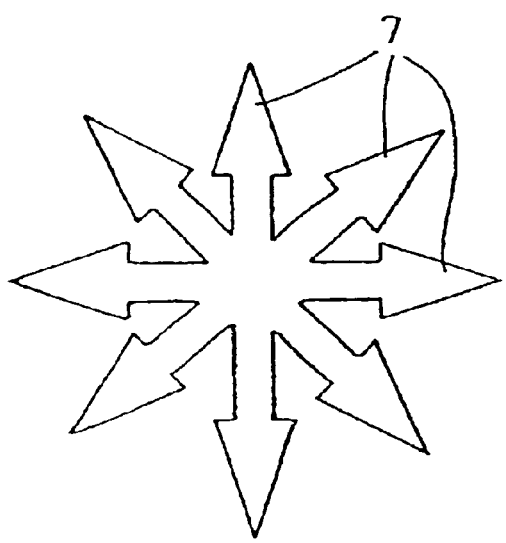
FIG. 7 shows the multi-axial alignment of the UD fibre layers at 0°, 90°, +45°, −45°, 90°, 0°.

What is claimed is:

1. SMC (Sheet Moulding Compound) for producing fibre-reinforced thermosetting components consisting of a resin matrix (2) which is fibre-reinforced with unidirectional fibres (UD fibres) (7) arranged in axial alignment and advantageously with additional cut fibres (random fibres) (4) arranged in non-aligned manner in the resin matrix (2), characterised in that several layers of SMC containing UD fibres (7), at least one layer having a different axial alignment from another layer, are arranged in the component.

2. SMC according to claim 1, characterised in that the random fibres (4) are glass fibres and the UD fibres (7) are carbon fibres or vice versa.

3. SMC according to claim 1, characterised in that the UD fibres (7) and the random fibres (4) are carbon fibres.

4. SMC according to claim 1, characterised in that the UD fibres (7) are carbon fibres and no random fibres (4) are used.

5. SMC according to claim 1, characterised in that the UD fibres (7) are "heavy tow" carbon fibre tows or "heavy tow" broad-strip carbon fibre tows.

6. SMC according to claim 1, characterised in that the UD fibres (7) are shortened by incisions in the finished SMC to produce flowability in the fibre direction.

7. SMC according to claim 6, characterised in that the cutting width of the tool for cutting the UD fibre layers is between 2 mm and 15 mm.

8. SMC according to claim 1, characterised in that a different resin matrix (2) is used for the random fibres (4) and the UD fibres (7).

9. SMC according to claim 1, characterised in that, to check the UD fibre directions, individual UD glass fibres are introduced into the matrix (2) in the direction of the UD carbon fibres (7) as contrast fibres.

10. SMC according to claim 1, characterised in that the SMC weight per unit area is less than 1000 gram/$M^2$.

11. SMC according to claim 1, characterised in that the resin matrix (2) contains electrically conductive additives.

12. Process for producing a fibre-reinforced SMC according to claim 1, characterised in that SMC mats with a single layer of UD fibres (7) are produced and in that a plurality of SMC mats is arranged, prior to further processing to form the component (16), with multi-axial alignment of the UD fibres (7) by building up into a stack (19).

13. Process according to claim 12, characterised in that all the UD fibre layers (7) used are aligned in the 0° direction and any desired number of fibre layers (7) are used.

14. Process according to claim 12, characterised in that at least four UD fibre layers (7) are arranged.

15. Process according to claim 14, characterised in that the four UD fibre layers (7) have the following alignment 0°, 90°, 90°, 0° or 0°, 90°, 0°, 90°.

16. Process according to claim 12, characterised in that at least six UD fibre layers (7) are arranged.

17. Process according to claim 16, characterised in that the six UD fibre layers (7) have the following alignment

0°, 90°; +45°, −45°, 90°, 0°.

18. Process according to claim 12, characterised in that eight UD fibre layers (7) are arranged.

19. Process according to claim 18, characterised in that the eight UD fibre layers (7) have the following alignment

0°, 90°; +45°, −45°, +45°, −45°, 90°, 0°.

20. Process according to claim 12, characterised in that the SMC mats are cut into strips (12) and would onto spools or reels (8), in that the strips (12) are cut to length and arranged in rectangular blank layers and in that the individual blank layers (11) are built up into a stack (19) on a rotary table (14).

21. Process according to claim 20, characterised in that the stack (19) is placed into the mould (press) (18) for producing the component (16) or else is preshaped by prepressing for the purpose of securing.

22. Process according to claim 21, characterised in that the press for preshaping is an inverse form of the mould for producing the component (16).

23. Process according to claim 1, characterised in that the strips (12) are wound onto spools with a core diameter of greater than 200 mm and an outside diameter of greater than 500 mm.

24. Process according to claim 1, characterised in that the SMC is flowable and the blank size is always smaller than the laid out component surface.

25. Component made of fibre-reinforced thermosets, characterised in that this component is produced from an SMC according to claim 1.

26. Component according to claim 25 for use as an exterior part of a motor vehicle.

27. A process for producing a multi-layer fibre-reinforced SMC (Sheet Moulding Compound) for producing fibre-reinforced components, comprising:

providing a plurality of SMC mats, each SMC mat comprising a resin matrix fibre-reinforced with unidirectional fibres (UD fibres) arranged in axial alignment; and arranging the plurality of SMC mats in a stack with at least one of the plurality of SMC mats having a direction of axial alignment of the UD fibres rotated with respect to a direction of axial alignment of the UD fibres of another of the plurality of SMC mats.

28. The process according to claim 27, wherein each SMC mat includes additional cut fibres (random fibres) arranged in a non-aligned manner in the resin matrix.

29. The process according to claim 27, wherein the plurality of SMC mats includes four SMC mats.

30. The process according to claim 29, wherein the four SMC mats have the following alignment

0°, 90°, 90°, 0°.

31. The process according to claim 27, wherein the plurality of SMC mats includes six SMC mats.

32. The process according to claim 31, wherein the six SMC mats have the following alignment

0°, 90°, +45°, −45°, 90°, 0°.

33. The process according to claim 27, wherein the plurality of SMC mats includes eight SMC mats.

34. The process according to claim 33, wherein the eight SMC mats have the following alignment

0°, 90°, +45°, −45°, +45°, −45°, 90°, 0°.

35. Process according to claim 27, characterised in that the SMC mats are cut into strips and wound onto spools or reels, in that the strips are cut to length and arranged in rectangular blank layers and in that the individual blank layers are built up into a stack on a rotary table.

36. A multi-layer fibre-reinforced SMC (Sheet Moulding Compound) for producing fibre-reinforced components, comprising a plurality of SMC mats, each SMC mat comprising a resin matrix fibre-reinforced with unidirectional fibres (UD fibres) arranged in axial alignment; wherein the plurality of SMC mats are arranged in a stack with at least one of the plurality of SMC mats having a direction of axial alignment of the UD fibres rotated with respect to a direction of axial alignment of the UD fibres of another of the plurality of SMC mats.

37. The multi-layer fibre-reinforced SMC according to claim 36, wherein each SMC mat includes additional cut fibres (random fibres) arranged in a non-aligned manner in the resin matrix.

38. The multi-layer fibre-reinforced SMC according to claim 36, wherein the plurality of SMC mats includes four SMC mats.

39. The multi-layer fibre-reinforced SMC according to claim 38, wherein the four SMC mats have the following alignment
0°, 90°, 90°, 0°.

40. The multi-layer fibre-reinforced SMC according to claim 36, wherein the plurality of SMC mats includes six SMC mats.

41. The multi-layer fibre-reinforced SMC according to claim 40, wherein the six SMC mats have the following alignment
0°, 90°, +45°, −45°, 90°, 0°.

42. The multi-layer fibre-reinforced SMC according to claim 36, wherein the plurality of SMC mats includes eight SMC mats.

43. The multi-layer fibre-reinforced SMC according to claim 42, wherein the eight SMC mats have the following alignment
0°, 90°, +45°, −45°, +45°, −45°, 90°, 0°.

* * * * *